United States Patent Office 3,015,615
Patented Jan. 2, 1962

3,015,615
METHOD OF MAKING TUBULAR NUCLEAR FUEL ELEMENTS
Walter Precht, Baltimore, Raymond J. Geckle, Dundalk, and Louis Frank, Baltimore, Md., assignors to Martin-Marietta Corporation, a corporation of Maryland
No Drawing. Filed Apr. 8, 1958, Ser. No. 727,029
5 Claims. (Cl. 204—154.2)

This invention relates to a method of making tubular fuel elements which are suitable for use in nuclear reactors.

In nuclear reactors, the fissionable material is present in the form of fuel elements which may be tubular, rod-like or flat-plate types, comprising a core containing fissionable material and a cladding material completely encasing the core. The cladding material must be in close or intimate contact with the core or else "hot spots" will develop within the fuel element which cause rapid decline in the useful life of the element. Metallurgical bonding of the cladding material to the core would be the most desirable way in which these materials can be joined.

In the co-pending application of Tibor F. Nagey, Jack Hunter and William A. Maxwell entitled "Transportable Nuclear Reactor Power Plant," Serial No. 684,501, filed September 17, 1957, now abandoned, a nuclear reactor is disclosed in which tubular fuel elements of the present invention may be used.

An object of the present invention is to provide a method of joining separate materials such that the contact is intimate and a tenacious bond exists between them.

Another object of this invention is to provide an improved method of manufacturing fuel elements for use in nuclear reactors.

Other objects and advantages of this invention will become apparent from the following description and explanation thereof.

In accordance with the present invention, separate materials are joined by first providing clean surfaces which are to be in intimate contact, then subjecting the materials while in intimate contact to an operation by which the surfaces are forced into greater contact with each other. The joined materials may be heat-treated to improve the bond.

The materials to be joined in accordance with this invention are metals which are sinterable and which may be cold drawn. A metal as such or a metal incorporated in a cermet may be used. The materials to be joined are compatible at the sintering temperature. In nuclear fuel element applications, important considerations are neutron economy and structural stability at the elevated temperatures of reactor operation. Consequently, it is desired that fuel element components do not absorb neutrons to an excessive degree and have melting points well above the reactor operating temperature. Such materials have a thermal neutron absorption cross section below about 5.0 barns and melt between about 650° C. and 2620° C. Metals having the above properties are found in groups IIIa, VIb and VIII of the periodic table, for example, aluminum, stainless steel, nickel, molybdenum, etc.

Before joining the materials it is preferred that the surfaces be cleaned of any foreign matter which may interfere with intimate contacting of the two surfaces. Any of the conventional means for cleaning metallic surfaces may be resorted to in the present case, and such methods are readily understandable to those skilled in the art. For example, in cleaning stainless steel it is desirable to perform successive immersions of the steel member in alkaline and acidic baths.

The main application of the present invention resides in the preparation of fuel elements for nuclear reactors. In this connection cladding metals may be used to cover the entire surface of a cermet core which contains a fissionable material and a matrix metal. The metal matrix can be, for example, stainless steel, aluminum, nickel, molybdenum, etc. The fissionable material is used in ceramic form, for example, uranium dioxide, uranosic oxide, thorium oxide, plutonium oxide, etc. Usually the quantity of matrix material mixed with the ceramic material to form the cermet is not less than about 50% by volume of the total mixture and can be up to about 85%. If the cermet is first formed into a densified strip, the ceramic is usually present in an amount not greater than about 30% by volume of the starting mixture. As is well known, relatively high concentrations of ceramic material in a cermet tend to make the cermet brittle. Satisfactory tubes may be formed from $Al-UO_2$ cermet strip, when the uranium dioxide concentration is kept below approximately 50% by weight, and in the case of stainless steel-$UO_2$ cermets, the $UO_2$ concentration does not exceed about 35% by weight.

In the preparation of the cermet, powdered metal and powdered fissionable material are mixed in suitable proportions. The average particle size of each component of the cermet is about 200 to 500 mesh. The mixture of powdered ceramic fissionable material uniformly dispersed in a mass of powdered metal may be densified by powder rolling or powder pressing followed by standard rolling and annealing steps to produce a high density strip. The cermet strip may then be formed into a tube of the size required in the clad fuel element. Sintering of the compacted mixture of metal and ceramic powders at the sintering temperature of the metal causes the metal powder particles to consolidate and form an interlacing network or matrix throughout the core which holds the fissionable material in a compact form. The temperature to be used for sintering will be readily understood by those skilled in the art. For example, in the case of aluminum, a temperature of about 550° to about 600° C. may be used, whereas for stainless steel a temperature of about 1150° to about 1300° C. may be employed.

The clad material to be used for the manufacture of the fuel element is preferably of the same type as the matrix material of the cermet core. If the same metal is not used, then the matrix metal must be one which may be sintered with the clad metal so as to provide a metallurgical bond between the clad metal and the matrix of the cermet core.

After the surfaces of the separate materials or tubular members have been cleaned and placed in intimate relation with each other, they are held in such a position by suitable means. In the case of a tubular fuel element, an inner tubular cladding member is placed on a mandrel of slightly smaller diameter. One end of the inner clad member is swaged to the mandrel and then cold drawn to the desired thickness. The cermet core is mounted on the inner clad and then an outer clad is mounted on the core, the ends of the outer clad extending beyond the ends of the core. The outer clad is also swaged at one end so that it firmly grips the underlying inner clad. In the case where separate metals are being joined, the same procedure can be used except that a cermet core is absent from the final product. The assembly consisting of the materials which are to be joined is then subjected to an operation in which the surfaces are forced together in more intimate relation. This can be accomplished by cold drawing.

In bringing the surfaces to be joined in closer contact, a reduction in cross-sectional area of the materials is effected. For the purpose of this invention, in general, a reduction of about 5 to about 50% of the original value is effected. It may be desirable to subject the material which is being drawn to an intermediate annealing step to avoid undue work hardening of the material.

An important step in the preparation of the bonded materials is the sintering or diffusion bonding. After the material has been subjected to treatment for reduction in cross-sectional area, the surfaces to be bonded are in intimate contact. By heating the materials to a temperature at which they will sinter, migration or diffusion of atoms or molecules occurs between the materials at the surface of intimate contact. Such diffusion creates a metallurgical bond which is difficult to separate or break and, therefore, exhibits substantially enhanced mechanical properties.

To provide a better understanding of this invention, reference will be had to the following specific example:

A mixture of stainless steel and uranium dioxide is prepared by admixing stainless steel powder having an average particle size of 200 mesh with powdered uranium oxide having an average particle size of 325 mesh in quantities sufficient to provide a mixture containing 65% by weight of stainless steel. This mixture is next powder rolled into a cermet strip about 4½ inches wide by 0.030 inch thick having a density of approximately 75%. This cermet strip is then cut into desired lengths and cleaned by treatment in a furnace at a temperature of 1050° C. for one hour in a hydrogen atmosphere having a dew point better than −60° C. Next, the cermet strip is sintered in a furnace containing a hydrogen atmosphere for 1½ hours at about 1175° C. This furnace should have a dew point better than −60° C. The sintered cermet strip is next cold rolled to an intermediate thickness of 0.023–0.024 inch. The strip is again sintered as before and again cold rolled to a thickness of 0.0188 inch to 0.0192 inch. This strip is then cut to the desired dimensions and formed into a tubular shaped cermet core having an outer diameter of about 0.370 inch. This tubular element is then chemically cleaned and is now ready for insertion between the clad members. An outer clad and an inner clad having thicknesses of about 0.020 inch are next prepared from stainless steel and each of these clads is chemically cleaned. A suitable mandrel having a diameter of 0.318 inch is prepared and the inner clad is slid over the mandrel, the tubular core is slid over the inner clad, and the outer clad is slid over the tubular core. Next, this assembly is drawn through successive dies to reduce the diameter of the assembly to 0.378 inch. The mandrel is then removed and the core and clad are pre-bonded by heating the assembly in a furnace containing a hydrogen atmosphere having a dew point better than −60° C. at 1150° C. for one-half hour. Next, a second mandrel having a slightly smaller diameter than the first mandrel (0.3147–0.3142 inch) is inserted in the assembly and the assembly is again drawn through successively smaller dies until it has an outer diameter of 0.374 inch. The second mandrel is then removed and the final bond between the core and the clad is accomplished by heating the assembly in a furnace containing a hydrogen atmosphere having a dew point better than −60° C. at 1150° C. temperature for one-half hour. The assembled fuel element is now ready for cleaning and use.

Having thus described the invention by reference to a specific example, it should be understood that the invention is to be defined by the appended claims.

We claim:

1. The method of metallurgically bonding an assembly comprising an inner metal tube, an outer metal tube and a cylindrical cermet core encased between said inner and outer metal tubes, said cermet core consisting of particles of an oxide of a fissionable metal dispersed in a metal matrix, said oxide being selected from the group consisting of uranium dioxide, uranosic oxide, thorium oxide and plutonium oxide, said inner and outer tubes and said metal matrix being composed of a metal from one of the groups of the periodic table selected from group IIIa, group VIb and group VIII and having a thermal neutron absorption cross section of not more than about 5.0 barns, said oxide being selected from the group consisting of uranium dioxide, uranosic oxide, thorium oxide and plutonium oxide, said method comprising the steps of inserting a mandrel in said inner tube, cold drawing said assembly so as to bring said cermet core into contact with said inner and outer tubes, and subsequently heating the assembly so as to form a metallurgical bond between said cermet core and said inner and outer tubes.

2. A method of metallurgically bonding an assembly comprising an inner metal tube, an outer metal tube and a cylindrical cermet core comprising particles selected from the group consisting of uranium dioxide, uranosic oxide, and plutonium oxide, said particles dispersed within a metal matrix, said matrix metal and said tubes being of the same metal and selected from the group including stainless steel, aluminum, nickel and molybdenum, said method comprising the steps of inserting a mandrel in said inner tube, cold drawing said assembly so as to bring said cermet core into intimate contact with said inner and outer tubes, and subsequently heating the assembly so as to form a metallurgical bond beween said cermet core and said inner and outer tubes.

3. A method of metallurgically bonding an assembly comprising an inner stainless steel tube, and outer stainless steel tube and a cylindrical cermet core encased between said inner and outer tubes, said cermet core consisting of particles selected from the group consisting of uranium dioxide, uranosic oxide, thorium oxide and plutonium oxide, said particles dispersed within a stainless steel matrix, the said method comprising the steps of inserting a mandrel in said inner tube, cold drawing said assembly so as to bring said cermet core into intimate contact with said inner and outer tubes, and subsequently heating the assembly so as to form a metallurgical bond between said cermet core and said inner and outer tubes.

4. A method of metallurgically bonding an assembly comprising an inner stainless steel tube, an outer stainless steel tube and a cylindrical cermet core encased between said inner and outer tubes, said cermet core including particles of uranium dioxide and dispersed within a stainless steel matrix, the said method comprising the steps of inserting a mandrel in said inner tube, cold drawing said assembly so as to bring said cermet core into intimate contact with said inner and outer tubes, and subsequently heating the assembly so as to form a metallurgical bond between said cermet core and said inner and outer tubes.

5. A method of fabricating a tubular fuel element comprising the steps of mounting a stainless steel inner tube on a mandrel, swaging one end of said inner tube onto said mandrel, cold drawing the inner tube to a snug fit over the mandrel, chemically cleaning the outer surface of the inner tube, placing a chemically clean cermet core over said inner tube, said core comprising particles of an oxide of a fissionable metal selected from the group consisting of uranium dioxide, uranosic oxide, and plutonium oxide dispersed in a matrix of stainless steel, mounting on said core an outer stainless steel tube the ends of which extend beyond said core, swaging one end of said outer tube onto said inner tube to form an assembly, cold drawing said assembly so as to bring said core into intimate contact with said inner and outer tubes, and heating the drawn assembly in a non-oxidizing environment so as to metallurgically bond said core to said inner and outer tubes.

References Cited in the file of this patent

UNITED STATES PATENTS

| | | |
|---|---|---|
| 449,428 | Peck | Mar. 31, 1891 |
| 2,198,149 | Bangert | Apr. 23, 1940 |
| 2,219,434 | White | Oct. 29, 1940 |
| 2,501,826 | McCarthy et al. | Mar. 28, 1950 |
| 2,761,207 | Dodd et al. | Sept. 4, 1956 |

OTHER REFERENCES

AEC Document HW-52729, Sept. 18, 1957, page 27. Available from OTS, Dept. of Commerce, Washington 25, D.C.